United States Patent
Kobayashi et al.

(10) Patent No.: US 6,591,507 B2
(45) Date of Patent: Jul. 15, 2003

(54) OPERATIONAL LEVER FOR BUSH CUTTER

(75) Inventors: Takao Kobayashi, Wako (JP); Atsushi Kojima, Wako (JP), w; Kenjiro Hiratsuna, Wako (JP); Akito Kono, Wako (JP)

(73) Assignee: Honda Kogyo Kabushiki Kaisha (JP)

( * ) Notice: Subject to any disclaimer, the term of this patent is extended or adjusted under 35 U.S.C. 154(b) by 61 days.

(21) Appl. No.: 10/016,056

(22) Filed: Dec. 12, 2001

(65) Prior Publication Data

US 2002/0092179 A1 Jul. 18, 2002

(30) Foreign Application Priority Data

Jan. 15, 2001 (JP) ........................................ 2001-006358

(51) Int. Cl.$^7$ .............................................. B26B 19/00
(52) U.S. Cl. ........................................................ 30/276
(58) Field of Search .................... 30/276, 347; 56/11.3; 188/335, 340; 477/199, 200; 192/17 R (56) References Cited

U.S. PATENT DOCUMENTS

| 6,021,630 A | * | 2/2000 | Higashi et al. | ........... 30/276 X |
| 6,056,668 A | * | 5/2000 | Nagashima | ............... 30/276 X |
| 6,176,016 B1 | * | 1/2001 | Higashi et al. | ............... 30/276 |
| 6,196,082 B1 | * | 3/2001 | Iwata | ...................... 30/276 X |

FOREIGN PATENT DOCUMENTS

JP     02163427     6/1990

* cited by examiner

*Primary Examiner*—Douglas D. Watts
(74) *Attorney, Agent, or Firm*—Adams & Wilks (57) ABSTRACT

An operational lever for a bush cutter includes a handle housed in a handle case, a throttle lever pivotally mounted to the handle, and a lock lever pivotally mounted to the handle. The operational lever further includes a torsional coil spring which exerts a resilient force on the lock lever. The lock lever is pivoted from an initial position to a pivoted position by an operator's palm. The throttle lever is then pivoted to a half-pivoted position by operator's fingers. When the palm is moved a small distance away from the handle case with the throttle lever held in the half-pivoted position, the lock lever is pivoted back towards the initial position by a resilient force of the spring. This causes a curved surface of a side protrusion portion of the lock lever to engage or abut on a side of a protrusion portion of the throttle lever. This arrangement is advantageous in that even when the operator takes her or his fingers off the throttle lever, the throttle lever is locked by a friction force produced between the curved surface and the side.

1 Claim, 11 Drawing Sheets

OPERATIONAL LEVER FOR BUSH CUTTER

FIELD OF THE INVENTION

The present invention relates to an improved operational lever for a bush cutter, which is locked not only when an engine of the bush cutter is idled but also when a throttle valve of a carburetor provided on the engine is half-opened, such that a human operator comfortably operates the lever.

BACKGROUND OF THE INVENTION

Known operational levers for bush cutters having prime movers include throttle levers for controlling amounts by which throttle valves are opened, and lock levers for limiting movements of the throttle levers. One example of such operational levers is disclosed in Japanese Patent Laid-Open Publication No. HEI 2-163427 entitled "THROTTLE APPARATUS FOR INTERNAL COMBUSTION ENGINE".

The disclosed apparatus suitable for use on a bush cutter includes a first lever connected via a wire to a throttle valve of a carburetor of an internal combustion engine of the cutter, a second lever pivotable together with the first lever, and a safety lock lever for locking the second lever in place when the throttle valve is opened to such an extent as to idle the engine. The second lever has an adjustment screw abutting on the first lever.

As discussed above, the safety lock lever locks the second lever in place when the throttle valve is opened to idle the engine, such that a human operator can not operate the second lever. When cutting bush, the operator moves the first and second levers to respective intermediate positions in which the throttle valve is half-opened to operate the engine at a given engine speed. To perform the cutting operation maintaining the given engine speed, the operator should hold the second lever in the intermediate position by her or his fingers. While holding the second lever in the intermediate position, during the cutting operation, the operator should also orient the bush cutter in various directions to cut bushes. What has been needed is an operational lever including first and second levers both designed to be held in the respective intermediate positions, such that the operator can comfortably perform the cutting operation.

SUMMARY OF THE INVENTION

An object of the present invention is to provide an operational lever for a bush cutter including a throttle lever for opening and closing a throttle valve of a carburetor provided on an engine of the bush cutter, and a lock lever for holding the throttle lever in place not only when the engine is idled but also when the throttle valve is half-opened, thereby imposing a reduced burden of operating the lever on a human operator.

According to an aspect of the present invention, there is provided an operational lever for a bush cutter including an operational rod, a prime mover mounted at a rear end of the operational rod, a cutting blade mounted at a front end of the operational rod, the cutting blade being driven by the prime mover, the operational lever comprising: (A) a handle extending from the operational rod substantially at right angles thereto; (B) a pivotable throttle lever for adjusting an amount by which a throttle valve of the prime mover is opened, the throttle lever having a first handle mounting portion attached to the handle; (C) a first spring for urging the throttle lever in a first direction to close the throttle valve; (D) a pivotable lock lever having a second handle mounting portion attached to the handle; and (E) a second spring for urging the lock lever in a second direction opposite to the first direction; the throttle lever including: (a) a cable connection arm extending from the handle mounting portion and being connected to the prime mover through a throttle cable; (b) a throttle lever operational portion extending from the first handle mounting portion in a direction substantially perpendicular to the cable connection arm; and (c) a protrusion portion extending from the throttle lever operational portion in substantially parallel to the cable connection arm; the lock lever including: (a') a lock lever operational portion extending from the second handle mounting portion; and (b) a lock arm portion extending from the second handle mounting portion in a direction substantially perpendicular to the lock lever operational portion, the lock arm portion being opposed to the protrusion portion of the throttle lever; the lock arm portion having a side protrusion portion formed at an end thereof, the side protrusion portion projecting sideways of the lock arm portion; the protrusion portion moving in a first line as the throttle lever pivots, the side protrusion portion moving in a second line as the lock lever pivots, the first line and the second line intersecting, such that when the lock lever remains urged in the second direction, the throttle lever is prevented from pivoting in the second direction, when the lock lever pivots in the first direction, the throttle lever is allowed to pivot in the second direction, and when the lock lever pivots back in the second direction after the throttle lever pivots in the second direction, the side protrusion portion engages the protrusion portion to prevent the throttle lever from pivoting back in the first direction.

The protrusion portion and the lock arm portion are disposed such that the first line and the second line intersect. If an operator attempts to turn the throttle lever when the lock lever does not pivot but remain urged by the second spring in the second direction, the end of the protrusion portion comes into abutment on the end of the lock arm portion. The throttle lever is therefore prevented from pivoting in the second direction. When the lock lever pivots in the first direction, the throttle lever is allowed to pivot in the second direction. When the lock lever pivots back in the second direction after the throttle lever pivots in the first direction, the protrusion portion of the throttle lever and the lock arm portion of the lock lever are pressed against each other under resilient forces of the first and second springs to thereby prevent the throttle lever from pivoting back in the first direction.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENTS

Figure 1:
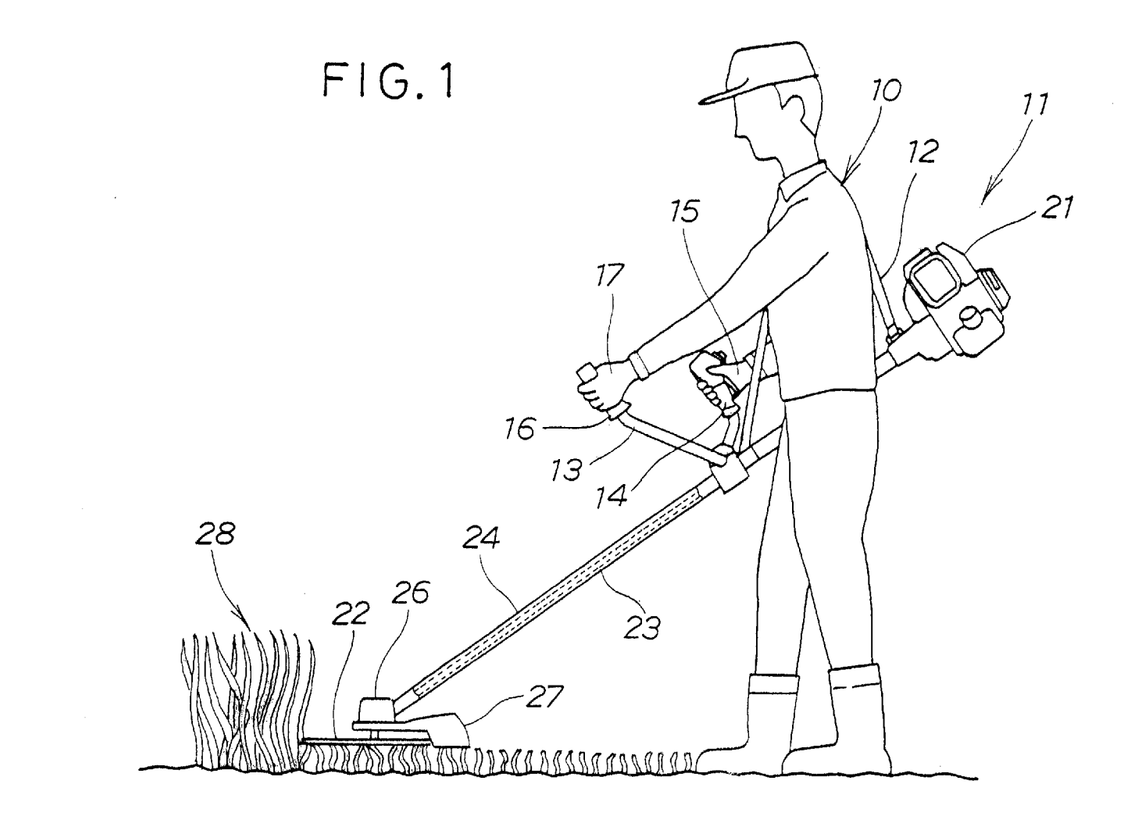
FIG. 1 is a side elevation view of a human operator manipulating a bush cutter using an operational lever according to the present invention.

Referring to FIG. 1, a human operator 10 is shown using a bush cutter 11 to cut bushes 28. The bush cutter 11 has a hanging belt 12 passing over one shoulder of the operator 10. With the belt 12, the bush cutter 11 is hung from the operator's shoulder. A U-shaped handle 13 provided on the bush cutter 11 has a first handle grip 14 provided thereto. The handle grip 14 is grasped by a right hand 15 of the operator 10. A second handle grip 16 provided on the handle 13 is grasped by a left hand 17 of the operator 10.

The bush cutter 11 includes a prime mover or an engine 21, a cutting blade 22 driven by the engine 21, a transmission shaft 23 for transmitting a motive power from the engine 21 to the blade 22 therethrough, and an operational rod 24 extending between the engine 21 and the blade 22 and housing therein the shaft 23. The engine 21 is mounted to a rear end of the rod 24. The blade 22 is mounted on a front end of the rod 24. The handle 13 extends from the rod 24 substantially at right angles thereto. The first handle grip 14 is mounted to one end of the handle 13. The second handle grip 16 is mounted to the other end of the handle 13. A gear case 26 is interposed between an end of the shaft 23 and the blade 22. A cover 27 covers a portion of the blade 22 positioned below the rod 23.

Figure 2:
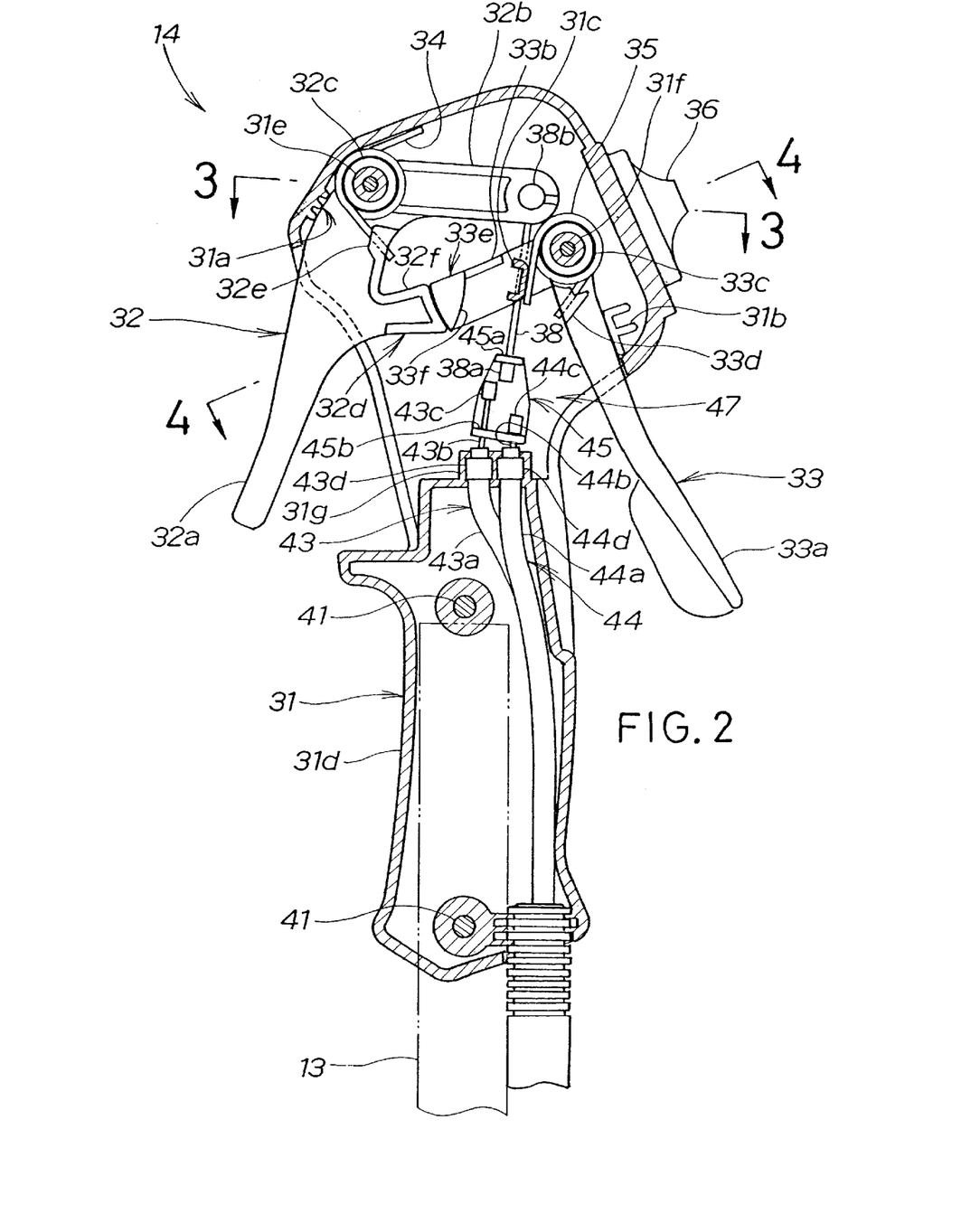
FIG. 2 is a vertical cross-sectional view of a first handle grip of the bush cutter.

As shown in FIG. 2, the first handle grip 14 has a handle case 31, a throttle lever 32 pivotally mounted to the handle case 31, a lock lever 33 pivotally attached to the handle case 31, a torsion coil spring (a first spring) 34 for urging the throttle lever 32 in a clockwise direction (a first direction), a torsion coil spring (a second spring) 35 for urging the lock lever 33 in a counterclockwise direction (a second direction), and an ignition cut-off switch 36 for bringing the engine 21 out of operation. The throttle lever 32 is provided for adjusting the engine speed of the engine 21. More specifically, the throttle lever 32 is to adjust amounts by which a throttle valve 70 of a carburetor 53 (see FIG. 6) is opened. The lock lever 33 is provided for limiting the pivotal movement of the throttle lever as will be described hereinbelow. The throttle lever 32 as shown in this figure remains urged in the clockwise direction to close the throttle valve 70.

The handle case 31 is formed by two case halves mated together by screws 41, 41. The handle case 31 has an upper part of the handle 13 housed therein. The handle case 31 includes a throttle lever stopper portion 31a disposed in contact with the throttle lever 32 to prevent the same from pivoting clockwise, a lock lever stopper portion 31b disposed in contact with the lock lever 33 to prevent the same from pivoting counterclockwise, a spring catching portion 31c against which one end of the spring 35 is held, and a grip portion 31d to be grasped by the operator's hand.

The throttle lever 32 includes an operational portion 32a (a throttle lever operating portion), a wire connection arm 32b (a cable connection arm) connected to a main wire 38, a first handle mounting portion 32c fitted over a support shaft portion 31e formed on the handle case 31, a protrusion portion 32d projecting towards the lock lever 33, and a spring insertion portion 32e into which one end of the spring 34 is inserted. When cutting bushes 28, the operator 10 turns the operational portion 32a by her or his finger (e.g., an index finger or a middle finger). The protrusion portion 32d has its side 32f. The wire connection arm 32b extends from the first handle mounting portion 32c and is connected via a throttle cable 43 to the engine 21. The operational portion 32a extends from the first handle mounting portion 32c in a direction substantially perpendicular to the wire connection arm 32b. The protrusion portion 32d extends from the operational portion 32a in substantially parallel to the wire connection arm 32b.

The lock lever 33 includes a press portion 33a (a lock lever operational portion) to be pushed by a palm of the operator 10, a swing stopper arm 33b (a lock arm) terminated adjacent the protrusion portion 32d for the purpose of limiting the pivotal movement of the throttle lever 32 as will be described later, a second handle mounting portion 33c fitted over a support shaft portion 31f formed on the handle case 31, and a spring insertion portion 33d into which another end of the spring 35 is inserted. The swing stopper arm 33b has a side protrusion portion 33e projecting sideways from an end thereof. The side protrusion portion 33e has a curved surface 33f. The press portion 33a extends from the second handle mounting portion 33c. The swing stopper arm 33b extends from the second handle mounting portion 33c in a direction substantially perpendicular to the press portion 33a. The swing stopper arm 33b is positioned in opposed relation to the protrusion portion 32d.

The first handle grip 14 has a relay member 45 disposed therewithin. The relay member 45 connects the main wire 38 to the throttle cable 43 and a brake cable 44. The brake cable 44 is used for releasing a brake applied to the blade 22 and extends to a braking device 65 (see FIG. 7).

The main wire 38 has one end attached to a wire end member 38a connected to the relay member 45. Another end of the main wire 38 is mounted on a wire end member 38b connected to the wire connection arm 32b.

The throttle cable 43 includes an outer tube 43a, an inner wire 43b movably inserted within the outer tube 43a, a wire end member 43c attached to one end of the inner wire 43b, and a tube end member 43d mounted to one end of the outer tube 43a.

The brake cable 44 includes an outer tube 44a, an inner wire 44b movably inserted within the outer tube 44a, a wire end member 44c mounted to one end of the inner wire 44b, and a tube end member 44d attached to one end of the outer tube 44a. The tube end members 43d, 44d are supported by a cable support portion 31g provided on the handle case 31.

The relay member 45 is U-shaped in cross-section. The relay member 45 has an upper end 45a for catching the wire end member 38*a* thereon, and a lower end 45*b* for catching the wire end members 43*c*, 44*c* thereon.

The inner wire 43*b* extends from the outer tube 43*a* to a greater extent than the inner wire 44*b* extends from the outer tube 44*a*. The wire end member 44*c* is to be caught on the lower end 45*b* while the wire end member 43*c* is spaced from the lower end 45*b*.

A distance is larger between the wire end member 43*c* and the lower end 45*b* than a distance between the wire end member 44*c* and the lower end 45*b*.

As discussed above, the wire end member 43*c* is spaced from the lower end 45*b* by a larger distance than the wire end member 44*c*. The relay member 45 is thus provided with a delay mechanism 47 arranged such that the relay member 45 pulls upwardly the inner wire 44*b* prior to pulling upwardly the inner wire 43*b* when the main wire 38 is pulled to lift the relay member 45.

Figure 3:
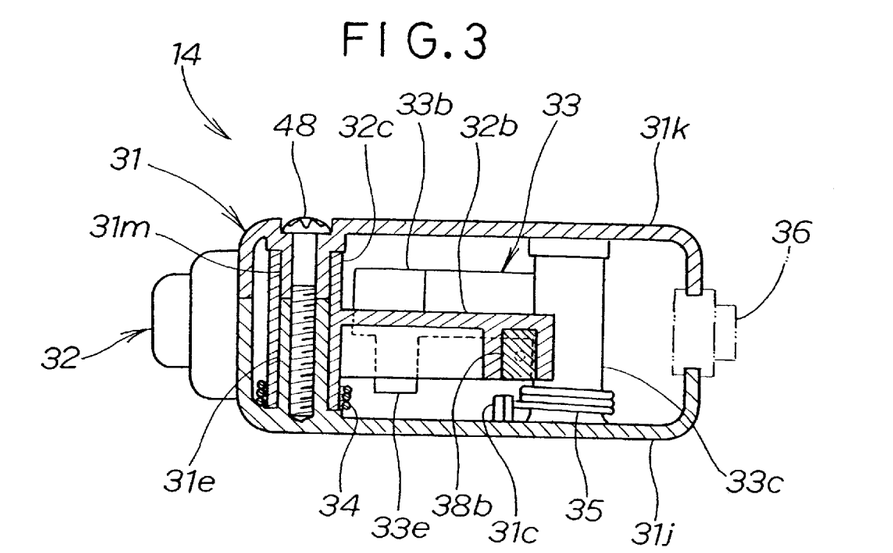
FIG. 3 is a cross-sectional view taken along line 3—3 of FIG. 2.

As shown in FIG. 3, the handle case 31 includes a first case half 31*j* and a second half case 31*k*. The first case half 31*j* has the support shaft portion 31*e* formed thereon. The second case half 31*k* has a support shaft portion 31*m* formed thereon. These support shaft portions 31*e*, 31*m* are fitted within the first handle mounting portion 32*c*. The wire connection arm 32*b* extends from the first handle mounting portion 32*c*. Caught on an end of the arm 32*b* is the wire end member 38*b*. The first and second case halves 31*j*, 31*k* are coupled together by a screw 48.

Figure 4:
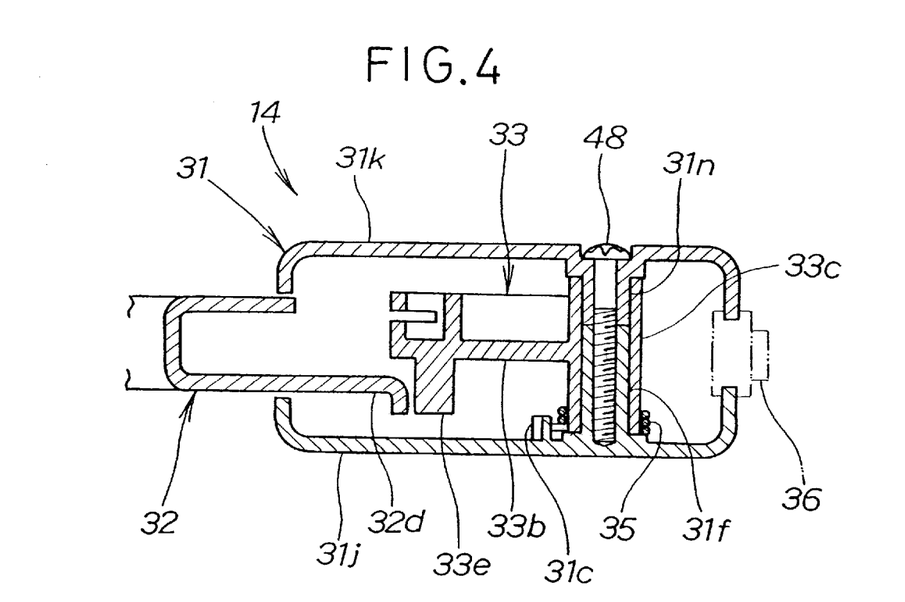
FIG. 4 is a cross-sectional view taken along line 4—4 of FIG. 2.

Referring to FIG. 4, the first case half 31*j* has the support shaft portion 31*f* provided thereon whilst the second case half 31*k* has a support shaft portion 31*n* provided thereon. The support shaft portions 31*f*, 31*n* are fitted within the second handle mounting portion 33*c*. The swing stopper arm 33*b* extends from the second handle mounting portion 33*c*. The side protrusion portion 33*e* is positioned proximate an end of the protrusion portion 32*d*.

Figure 5:
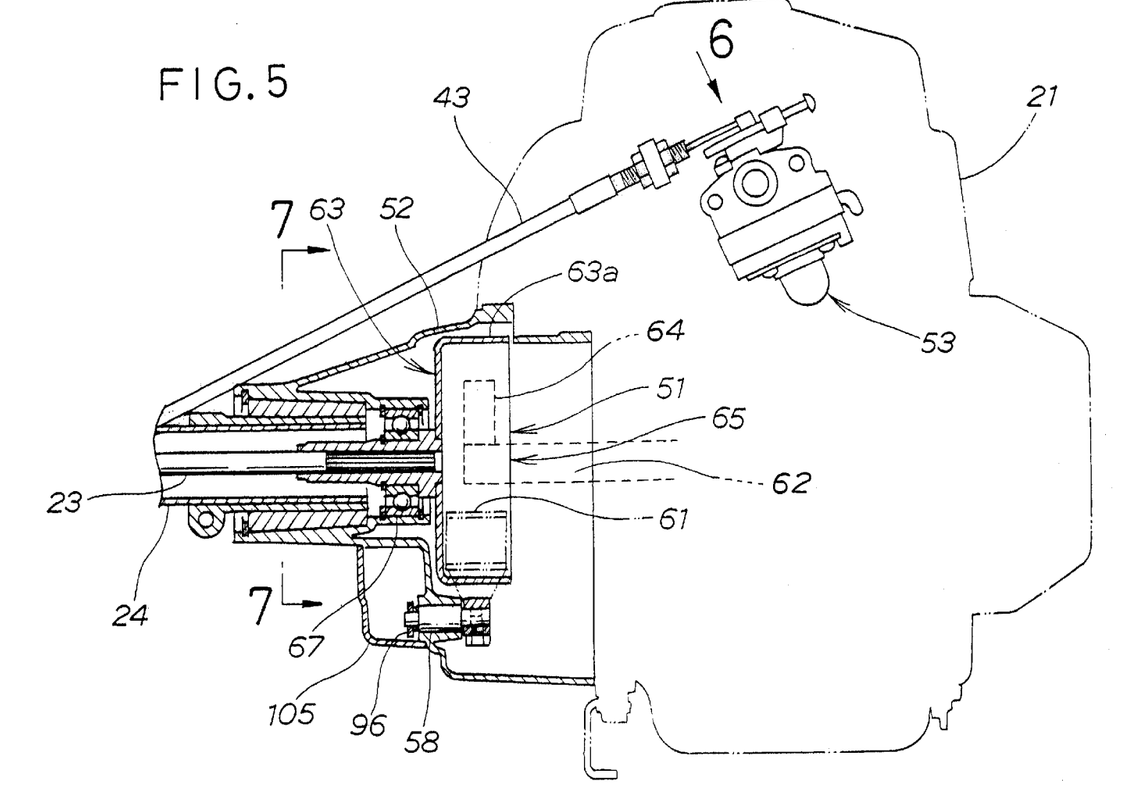
FIG. 5 is a cross-sectional view of a centrifugal clutch mounted at a front part of an engine of the bush cutter.

As shown in FIG. 5, the engine 21 has a centrifugal clutch 51 provided at a front part thereof. The centrifugal clutch 51 intermittently transmits the motive power from an output shaft 62 of the engine 21 to the transmission shaft 23. The centrifugal clutch 51 is housed in a clutch case 52 mounted on the front part of the engine 21. The clutch case 52 has the operational rod 24 mounted thereto. The engine 21 has the carburetor 53 mounted at a side thereof. The carburetor 53 has an end of the throttle cable 43 connected thereto. The clutch case 52 has a support shaft 58 rotationally mounted to a lower part thereof. Attached to the support shaft 58 is a brake shoe 61 of the braking device 65.

The centrifugal clutch 51 includes a weight 64 mounted to the output shaft 62, and a cup-shaped drum 63 having the weight 64 housed therein. When the engine 21 operates at a given engine speed, the weight 64 is subjected to a centrifugal force to thereby extend outwards into contact with the drum 63.

The drum 63 is attached to one end of the transmission shaft 23 at its bottom. The brake shoe 61 of the braking device 65 is to be pressed against an outer surface 63*a* of the drum 63 so as to thereby brake the operation of the transmission 23 or the cutting blade 22.

The one end of the transmission shaft 23 is rotationally supported by bearings 67. Another end of the transmission shaft 23 is rotationally positioned within the gear case 26.

Figure 6:
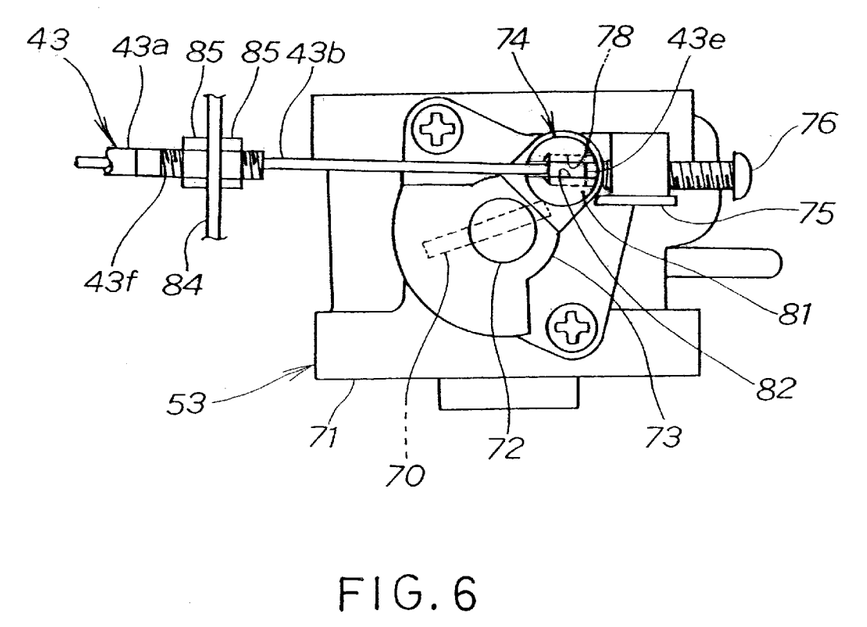
FIG. 6 is a view illustrating a carburetor of the bush cutter as viewed in a direction of arrow 6.

Reference is made to FIG. 6. The carburetor 53 includes a case 71, the throttle valve 70 for opening and closing an intake passage formed in the case 71, a throttle shaft 72 attached to the throttle valve 70, a throttle arm 73 mounted on the throttle shaft 72, a cylindrical wire mounting portion 74 rotationally mounted at an end of the throttle arm 73, a stopper portion 75 for limiting a counterclockwise pivotal movement of the throttle arm 73, and a screw 76 disposed at an adjusted position so that an end of the screw abuts on the throttle arm 73 when the throttle valve 70 is closed. When the throttle valve 70 is fully opened, the throttle arm 73 pivots counterclockwise into abutment on the stopper portion 75.

Formed in a side of the cylindrical wire mounting portion 74 is a horizontally extending hole 78. At a top surface 81 of the portion 74, there is formed a horizontally extending groove 82 in part communicating with the hole 78.

The groove 82 has its width smaller than an inner diameter of the hole 78. The width of the groove 82 is larger than the diameter of the inner wire 43*b*.

The inner wire 43*b* has a cylindrical member 43*e* mounted on an end thereof, and a tube end member 43*f* through which an end of an outer tube 34*a* is attached to a bracket 84 provided on the side of the engine 21.

In connecting the inner wire 43*b* to the wire mounting portion 74 of the carburetor 53, the inner wire 43*b*, lying in substantially parallel to the top surface 81, is initially positioned to allow the end of the wire 43*b* to fit into the groove 82. The cylindrical member 43*e* is then inserted into the hole 78.

For adjustment of tension of the inner wire 43*b*, nuts 85, 85 threadedly engaging an external thread formed on the tube end member 43*f* are first rotated to move away from the bracket 84 so that the tube end member 43*f* is loosened. Next, the tube end member 43*f* is axially moved to provide the inner wire 43*b* with a desired tension. Finally, the nuts 85, 85 are rotated to move back onto the bracket 84, such that the tube end member 43*f* is fastened to maintain the desired tension.

Figure 7:
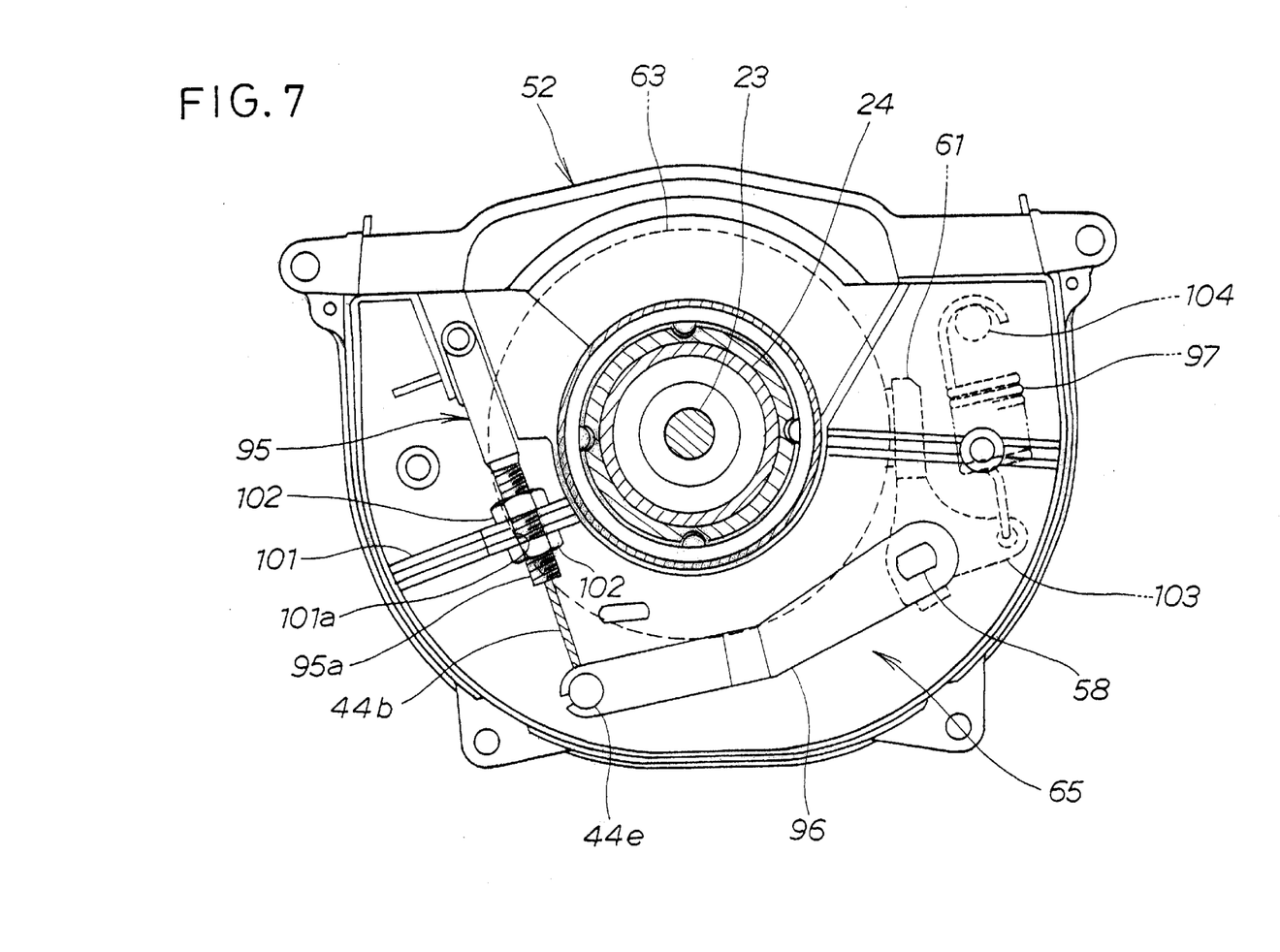
FIG. 7 is a cross-sectional view taken along line 7—7 of FIG. 5.

Reference is made to FIG. 7. The braking device 65 includes the brake cable 44 (see FIG. 2), a cable securing fitting 95 which mounts an end of the outer tube 44*a* to the clutch case 52, a brake arm 96 connected to an end of the inner wire 44*b* pulled out from within the fitting 95, the support shaft 58 on which the brake arm 96 is mounted, the brake shoe 61 mounted on the support shaft 58, the drum 63 against which the brake shoe 61 is pressed to brake the operation of the transmission shaft 23, and a tension coil spring 97 which produces a resilient force to press the brake shoe 61 against the drum 63. Mounted on an end of the inner wire 44*b* is a wire end member 44*e*. The inner wire 44*b* is connected via such a wire end member 44*e* to the brake arm 96.

As can be seen from this figure, the brake shoe 61 is shown as being pressed against the drum 63 by the resilient force since the inner wire 44*b* is not pulled.

The cable securing fitting 95 has an external thread 95*a* formed on an end thereof. On the clutch case 52, there is provided an upright wall 101 having a groove 101*a* formed therein. With the external thread 95*a* inserted into the groove 101*a*, nuts 102, 102 threadedly engaging the external thread 95*a* are tightened onto the wall 101.

The spring 97 has one end engaging a spring catching portion 103 of the brake shoe 61 and another end caught on a spring catching pin 104 attached to the clutch case 52.

FIG. 7 illustrates the braking device 65 with a case cover 105 (see FIG. 5) removed for explanatory purpose. The case cover 105 is positioned outside the clutch case 52 and covers the fitting 95 and the brake arm 96.

To adjust a tension of the inner wire 44b, the nuts 102, 102 are first rotated to move away from the wall 101 so as to loosen the fitting 95. The fitting 95 is then axially moved to provide the inner wire 44b with a desired tension. The nuts 102, 102 are rotated to move back onto the wall 101, such that the fitting 95 is tightened to maintain the desired tension.

Discussion will be made as to how the throttle lever 32 and the lock lever 33 are operated in accordance with the present invention. The engine 21 is first started to idle. Since the engine 21 is operated at an engine speed less than a given value, the centrifugal clutch 51 is disengaged. In other words, the clutch 51 does not transmit the motive power of the engine 21 to the cutting blade 22. The brake shoe 61 is pressed against the drum 63 to thereby prevent the blade 22 from rotating. The throttle lever 32 is locked by the lock lever 33 with the protrusion portion 32d disposed in the proximity of the side protrusion portion 33e.

Figure 8A:
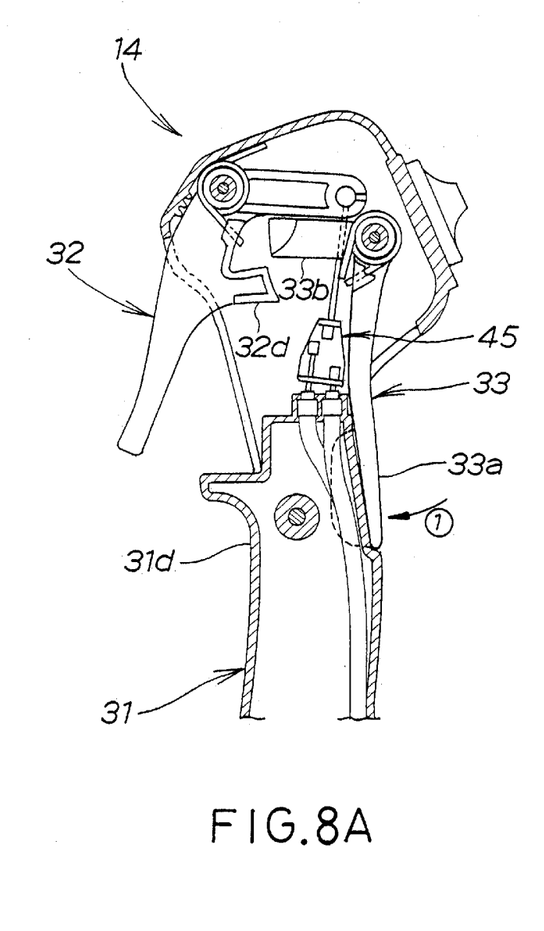
FIG. 8A shows the operational lever having a throttle lever in an initial position and a lock lever in a pivoted position and FIG. 8B shows the operational lever having the throttle lever in a half-pivoted position and the lock lever held in the pivoted position.

With respect to FIG. 8A, when the operator 10 grasps the grip portion 31d with her or his palm pressed against the press portion 33a, the lock lever 33 is caused to pivot clockwise from an initial position to a pivoted position, as shown by an arrow ①. The stopper arm 33b of the lock lever 33 is then caused to pivot clockwise to thereby move the side protrusion portion 33e away from the protrusion portion 32d. The throttle lever 32 is thus unlocked.

Figure 8B:
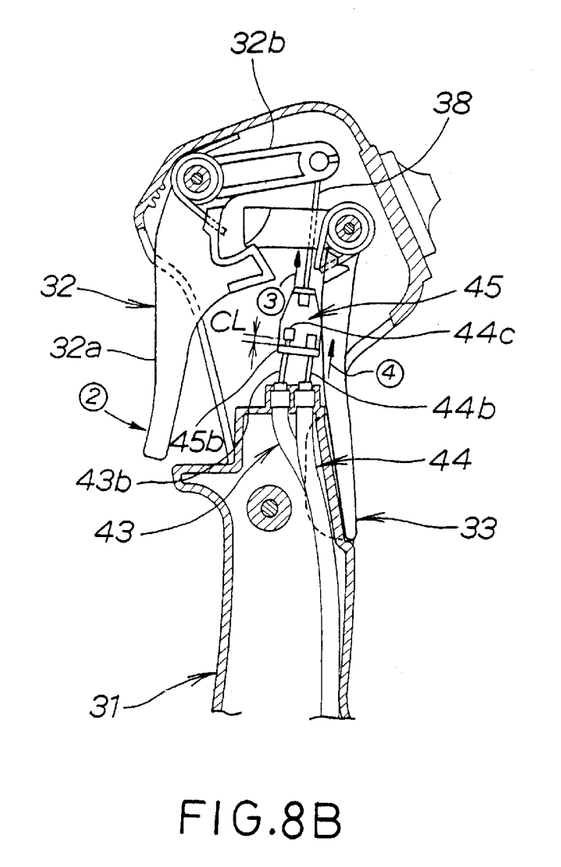

As shown in FIG. 8B, with operator's fingers held onto the operation portion 32a, the throttle lever 32 is caused to pivot counterclockwise, as shown by an arrow ②, from an initial position to a half-pivoted position. The throttle lever 32 is halfway through its full pivotal stroke. The main wire 38 is thereby pulled upwardly as shown by an arrow ③, whereupon the relay member 45 is moved upwardly.

The inner wire 44b of the brake cable 44 is thus pulled simultaneously with the main wire 38, as shown by an arrow ④.

The relay member 45 does not yet pull upwardly the inner wire 43b of the throttle cable 43 because a clearance CL is formed between the wire end member 44c and the lower end 45b.

Figure 9:
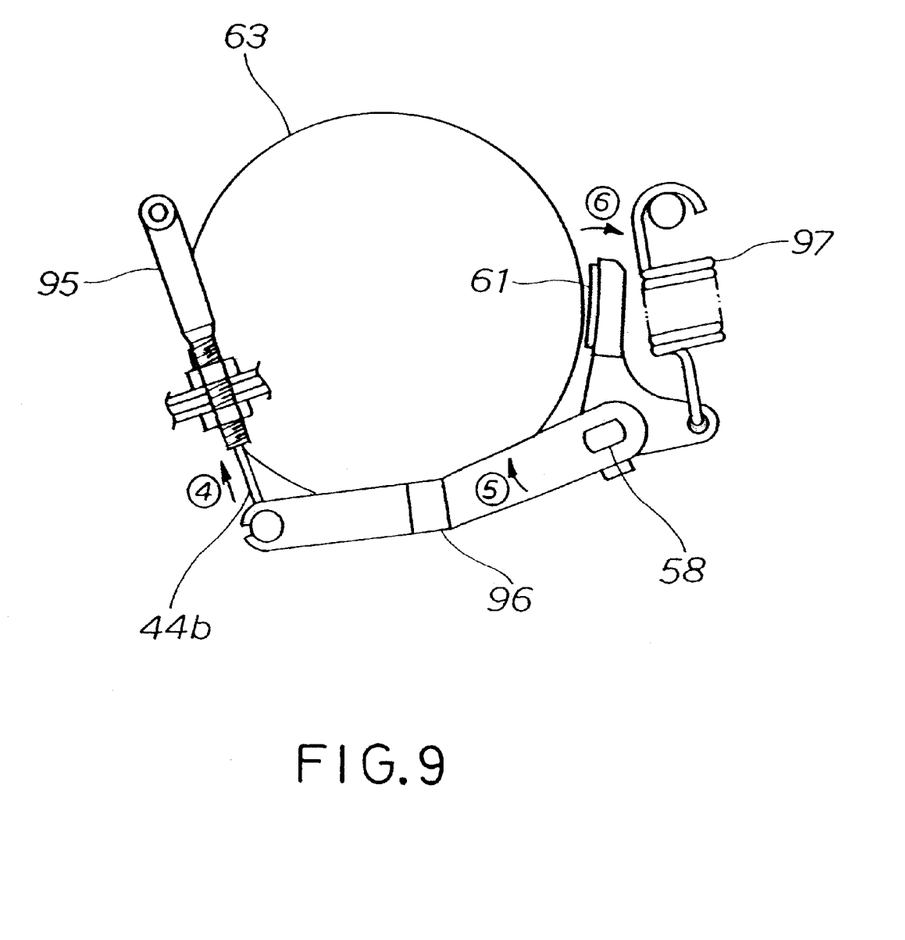
FIG. 9 shows how a brake device of the bush cutter is operated when the throttle lever is in the half-pivoted position and the lock lever is held in the pivoted position.

Reference is made to FIG. 9. Pulling the inner wire 44b, as shown by the arrow ④, causes the brake arm 96 to pivot about the support shaft 58 as indicated by an arrow ⑤. The brake shoe 61 connected to the brake arm 96 is thus caused to pivot away from the drum 63 against the resilient force of the spring 97, as shown by an arrow ⑥.

Figure 10A:
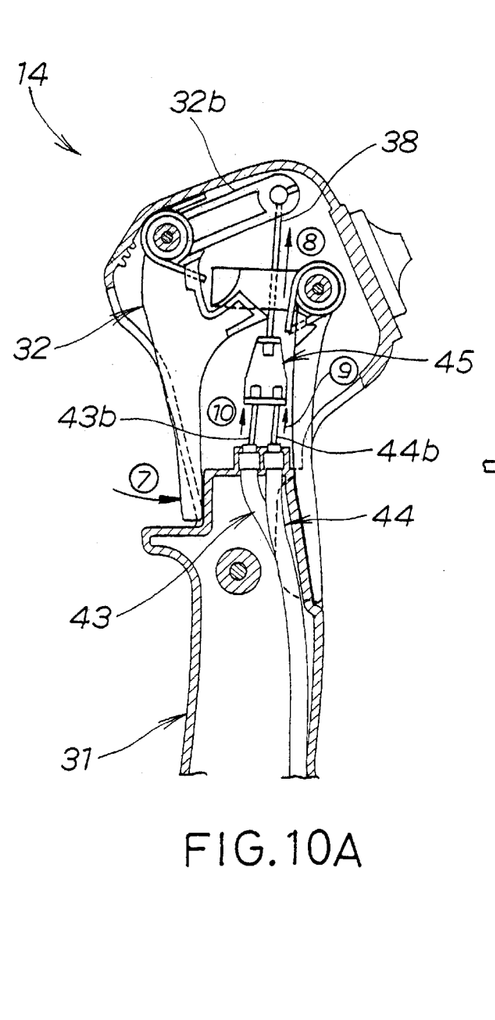
FIG. 10A shows the throttle lever in a fully pivoted position and the lock lever in the pivoted position and FIG. 10B shows how a throttle valve of the carburetor is fully opened when the throttle lever is in the fully pivoted position and the lock lever is in the pivoted position.

Turning to FIG. 10A, when the throttle lever 32 pivots from the half-pivoted position to a fully pivoted position, as shown by an arrow ⑦, the main wire 38 is further pulled in a direction of an arrow ⑧ to thereby move further upwardly the relay member 45.

This causes the inner wire 44b of the brake cable 44 to be pulled in a direction of an arrow ⑨ whereupon the inner wire 43b, which is arranged not to be pulled when the throttle lever 32 pivots to the half-pivoted position as shown in FIG. 8B, starts to be pulled upwardly as shown by an arrow ⑩.

Figure 10B:
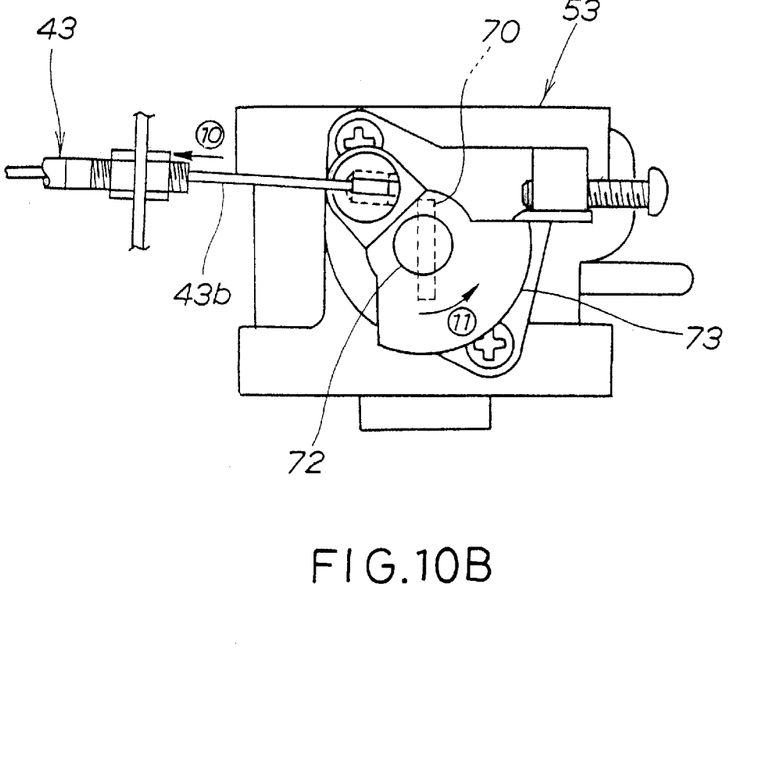

Pulling the inner wire 43b in the direction of the arrow ⑩ causes the throttle arm 73 of the carburetor 53 to pivot about the throttle shaft 72 in a counterclockwise direction of an arrow ⑪, as shown in FIG. 10B.

The throttle valve 70 mounted to the throttle shaft 72 is opened such that amount of air and fuel to be supplied to the engine 21 is increased to thereby increase the engine speed.

When the engine speed of the engine 21 is increased to the given value or more, the centrifugal clutch 51 is engaged. In other words, the clutch 51 comes into connection with the output shaft of the engine 21. Accordingly, the motive power of the engine 21 is transmitted to the blade 22. The cutting blade 22 thus supplied with the motive power starts to rotate.

Figure 11:
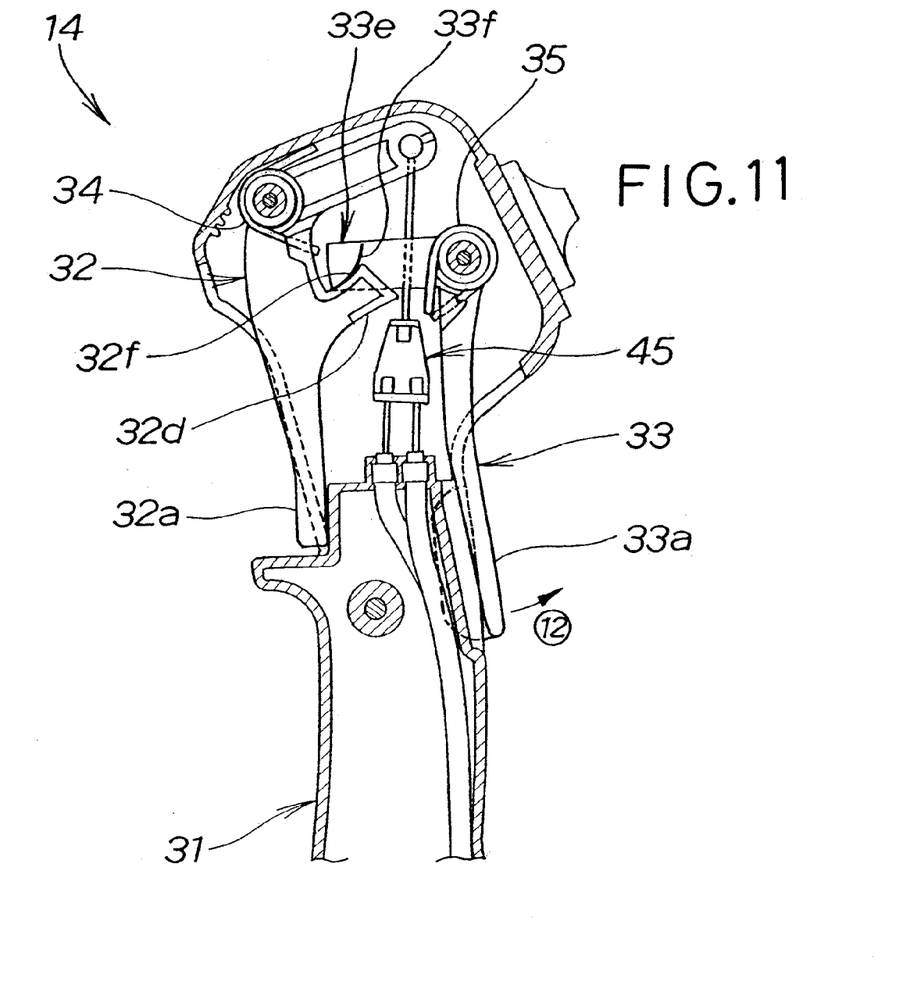
FIG. 11 shows how the lock lever locks the throttle lever in the fully pivoted position.

When the operator 10 moves her or his palm a small distance away from the handle case 31 with her or his fingers holding the throttle lever 32 in the fully pivoted position, the spring 35 forces the press portion 33a of the lock lever 33 to pivot counterclockwise as shown by an arrow ⑫.

This causes the curved surface 33f of the side protrusion portion 33e to move into engagement with or abutment on the side 32f of the protrusion portion 32d. The throttle lever 32 is consequently locked by a friction force generated between the side 32f and the curved surface 33f. Even if the operator takes her or his fingers off the operational portion 32a, the throttle lever remains locked by the friction force.

It will be appreciated that with the side 32f engaging the curved surface 33f, the throttle lever 32 may be locked at any position other than the fully pivoted position as shown in FIG. 11. The throttle lever 32 can be locked even when released from the operator's fingers. This results in a reduced burden of operating the lever on the operator 10.

Figure 12A:
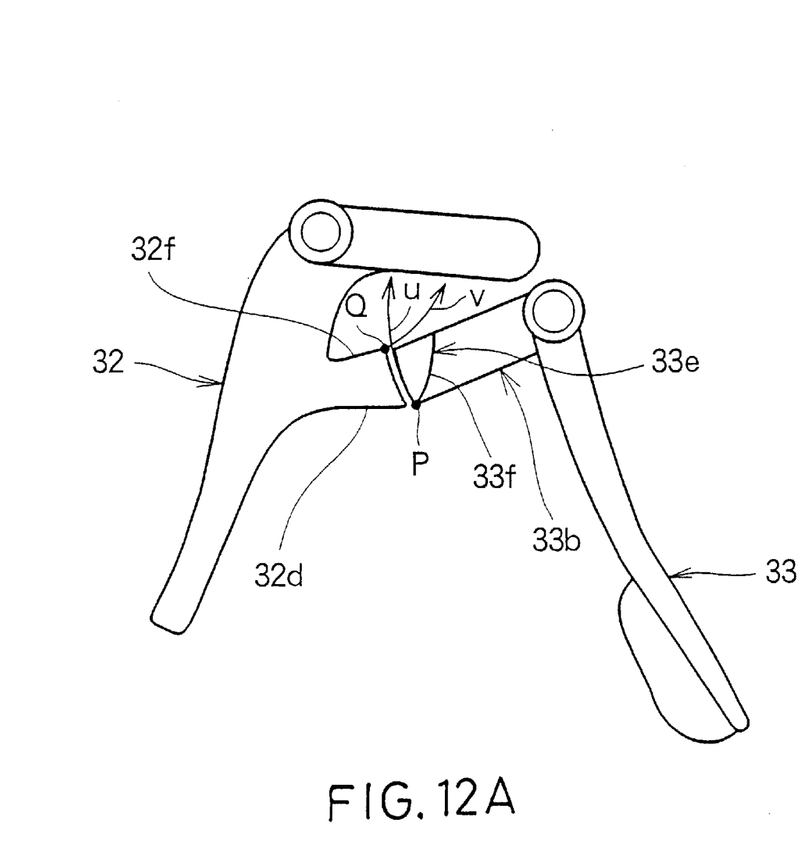
FIG. 12A shows the throttle lever locked by the lock lever in an initial position and FIG. 12B shows the throttle lever locked by the lock lever in the pivoted position.

As shown in FIG. 12A, the lock lever 33 remains urged in the counterclockwise direction, that is, the former is held in the initial position. Likewise, the throttle lever 32 remains urged in the clockwise direction, that is, the same is held in the initial position. In this position, the throttle lever 32 is prevented from pivoting in the counterclockwise direction. As the lock lever 33 is caused to pivot clockwise, an end P of the lock lever 33 moves in a line U. As the throttle lever 32 is caused to pivot counterclockwise, an end point Q of the protrusion portion 32d moves in a line V. The lines V and U intersect.

Figure 12B:
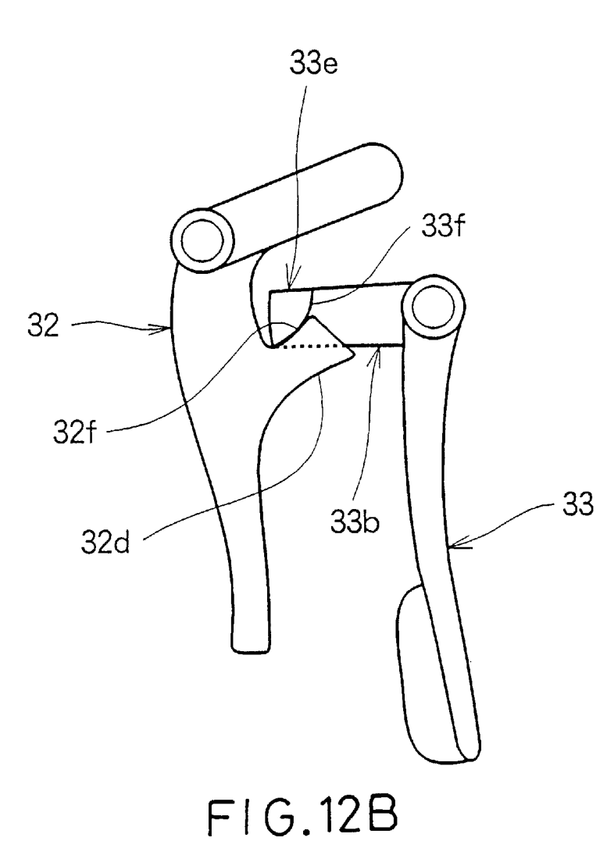

As shown in FIG. 12B, when the lock lever 33 is caused to pivot clockwise from the initial position to the pivoted position, the throttle lever 32 is allowed to pivot counterclockwise from the initial position. When the lock lever 33 pivots counterclockwise from the pivoted position back towards the initial position after the throttle lever 32 pivots counterclockwise, the side protrusion portion 33e is brought into engagement with or abutment on the protrusion portion 32d.

Because the spring 34 urges the throttle lever 32 in the clockwise direction while the spring 35 urges the lock lever 33 in the counterclockwise direction when the side 32f engages the curved surface 33f, it becomes possible to produce the friction force between the side 32f and the curved surface 33f to ensure that the throttle lever 32 is locked.

As is apparent from the foregoing description, it is to be noted that the throttle lever 32 can be held in the half-pivoted position with the operator's hand kept off the former. It becomes possible to impose a reduced burden of operating the throttle lever 32 on the operator's hand.

The present disclosure relates to the subject matter of Japanese Patent Application No. 2001-006358, filed Jan. 15, 2001, the disclosure of which is expressly incorporated herein by reference in its entirety.

What is claimed is:

1. An operational lever for a bush cutter including an operational rod, a prime mover mounted at a rear end of said operational rod, a cutting blade mounted at a front end of said operational rod, said cutting blade being driven by said prime mover, said operational lever comprising:

(A) a handle extending from said operational rod substantially at right angles thereto;

(B) a pivotable throttle lever for adjusting an amount by which a throttle valve of said prime mover is opened, said throttle lever having a first handle mounting portion attached to said handle;

(C) a first spring for urging said throttle lever in a first direction to close said throttle valve;

(D) a pivotable lock lever having a second handle mounting portion attached to said handle; and (E) a second spring for urging said lock lever in a second direction opposite to said first direction;

said throttle lever including:
- (a) a cable connection arm extending from said handle mounting portion and being connected to said prime mover through a throttle cable;
- (b) a throttle lever operational portion extending from said first handle mounting portion in a direction substantially perpendicular to said cable connection arm; and
- (c) a protrusion portion extending from said throttle lever operational portion in substantially parallel to said cable connection arm;

said lock lever including:
- (a') a lock lever operational portion extending from said second handle mounting portion; and
- (b') a lock arm portion extending from said second handle mounting portion in a direction substantially perpendicular to said lock lever operational portion, said lock arm portion being opposed to said protrusion portion of said throttle lever;

said lock arm portion having a side protrusion portion formed at an end thereof, said side protrusion portion projecting sideways of said lock arm portion;

said protrusion portion moving in a first line as said throttle lever pivots, said side protrusion portion moving in a second line as said lock lever pivots, said first line and said second line intersecting, such that when said lock lever remains urged in the second direction, said throttle lever is prevented from pivoting in said second direction, when said lock lever pivots in said first direction, said throttle lever is allowed to pivot in said second direction, and when said lock lever pivots back in said second direction after said throttle lever pivots in said second direction, said side protrusion portion engages said protrusion portion to prevent said throttle lever from pivoting back in said first direction.

* * * * *